United States Patent
Zhang et al.

(10) Patent No.: US 9,543,771 B2
(45) Date of Patent: Jan. 10, 2017

(54) TELESCOPIC TRANSMISSION CABLE DEVICE AND MOBILE TERMINAL

(71) Applicant: ZTE Corporation, Shenzhen (CN)

(72) Inventors: Zhenming Zhang, Shenzhen (CN); Minrui Fu, Shenzhen (CN); Jiande Huang, Shenzhen (CN); Jingtang Yang, Shenzhen (CN); Biyun Shi, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/023,949

(22) PCT Filed: Jul. 29, 2014

(86) PCT No.: PCT/CN2014/083258
§ 371 (c)(1),
(2) Date: Mar. 22, 2016

(87) PCT Pub. No.: WO2015/039497
PCT Pub. Date: Mar. 26, 2015

(65) Prior Publication Data
US 2016/0233704 A1 Aug. 11, 2016

(30) Foreign Application Priority Data
Sep. 22, 2013 (CN) ...................... 2013 2 0589253 U

(51) Int. Cl.
*H02J 7/00* (2006.01)
*H01F 27/28* (2006.01)
(Continued)

(52) U.S. Cl.
CPC ......... *H02J 7/0042* (2013.01); *H01F 27/2823* (2013.01); *H01F 38/14* (2013.01);
(Continued)

(58) Field of Classification Search
CPC ......... H02J 7/0042; H02J 7/0052; H02J 7/025
(Continued)

(56) References Cited

U.S. PATENT DOCUMENTS 8,222,870 B2 * 7/2012 Guo .................... H01M 10/441
320/130
2009/0160262 A1 6/2009 Schmidt
(Continued)

FOREIGN PATENT DOCUMENTS

CN 203104001 U 7/2013
CN 203119575 U 8/2013
(Continued)

OTHER PUBLICATIONS

International Search Report in international application No. PCT/CN2014/083258, mailed on Nov. 6, 2014.
(Continued)

*Primary Examiner* — M'Baye Diao
(74) *Attorney, Agent, or Firm* — Oppedahl Patent Law Firm LLC

(57) ABSTRACT

Disclosed are a telescopic transmission cable device and a mobile terminal. The device comprises: a cable body and a rectification part, wherein the cable body comprises at least two wires insulated inform each other, one end of the cable body is a built-in end while the other end is an external connection end; when the cable body is coiled up into a coil, the external connection end and the built-in end are respectively connected to two input ends of the rectification part, and the two output ends of the rectification part are respectively connected to a positive and negative electrodes of a power supply to be charged; and when the cable body is in a linear shape, the external connection end is connected to an external device, the two wires of the built-in end are respectively connected to the positive and negative elec-
(Continued)

trodes of the power supply to be charged, and the two output ends of the rectification part are respectively disconnected to the positive and negative electrodes of the power supply to be charged. The telescopic transmission cable device is applicable to a variety of mobile terminals.

19 Claims, 2 Drawing Sheets

(51) Int. Cl.
　　　*H01F 38/14*　　　(2006.01)
　　　*H02J 7/02*　　　(2016.01)
(52) U.S. Cl.
　　　CPC .......... *H02J 7/0052* (2013.01); *H02J 7/0055* (2013.01); *H02J 7/025* (2013.01); *H02J 50/10* (2016.02); *H02J 2007/0059* (2013.01); *H02J 2007/0062* (2013.01)
(58) Field of Classification Search
　　　USPC ........................................................ 320/108
　　　See application file for complete search history.

(56) References Cited

U.S. PATENT DOCUMENTS

2012/0043931 A1　　2/2012　Terao
2012/0161697 A1　　6/2012　Park

FOREIGN PATENT DOCUMENTS

CN　　　203574398 U　　4/2014
EP　　　　2472353 A1　　7/2012

OTHER PUBLICATIONS

English Translation of the Written Opinion of the International Search Authority in international application No. PCT/CN2014/083258, mailed on Nov. 6, 2014.
Supplementary European Search Report in European application No. 14846273.2, mailed on Jun. 28, 2016.

* cited by examiner

TELESCOPIC TRANSMISSION CABLE DEVICE AND MOBILE TERMINAL

TECHNICAL FIELD

The present disclosure relates to electronic information technologies and, in particular to, a telescopic transmission cable device and a mobile terminal.

BACKGROUND

Mobile terminals such as a mobile phone and a tablet computer can be carried by people to everywhere, and it is greatly convenient for people's life.

However, most of the mobile terminals have a relatively short standby time; therefore, conveniently charging the mobile terminal becomes particularly important. At present, a charge method mainly includes wired charge and wireless charge. The wired charge method needs a special cable and a fixed power supply, which has more restrictions and poor flexibility despite of high charge efficiency. The wireless charge method needs to set a special receiving coil and a circuit inside a mobile terminal and a user can charge the mobile terminal without a special cable; however, the receiving coil is disposed on a circuit board inside the terminal and the coil design is limited by the size of the mobile terminal.

SUMMARY

In view of the above, the present disclosure provides a telescopic transmission cable device and a mobile terminal to solve the above problems in the conventional technology.

To solve the above problems, according to an aspect, the embodiments of the present disclosure provide a telescopic transmission cable device, including: a cable body and a rectification part, wherein the cable body includes at least two wires insulated from each other, and one end of the cable body is a built-in end while the other end is an external connection end; when the cable body is coiled up into a coil, the external connection end and the built-in end are respectively connected to two input ends of the rectification part, and the two output ends of the rectification part are respectively connected to a positive electrode and a negative electrode of a power supply to be charged; and when the cable body is in a linear shape, the external connection end is connected to an external device, the two wires of the built-in end are respectively connected to the positive electrode and the negative electrode of the power supply to be charged, and the two output ends of the rectification part are respectively disconnected to the positive electrode and the negative electrode of the power supply to be charged.

Preferably, the device may further include a gating device and a controllable switch device; the gating device includes a connection end and two optional ends, so that the connection end is connected to one of the two optional ends, wherein the connection end is connected to the built-in end, and the two optional ends are respectively connected to the power supply to be charged and one of the two input ends of the rectification part; and wherein the controllable switch device is disposed between the rectification part and the power supply to be charged.

Preferably, the gating device further includes a third optional end, so that the connection end is connected to one of the three optional ends; the third optional end is grounded or suspended in midair.

Specifically, the cable body is a Universal Serial Bus (USB) without a shielding layer.

Preferably, the rectification part includes a full-bridge rectifier circuit or a half-bridge rectifier circuit.

Preferably, the biggest diameter of the coil is between 4 cm and 8 cm.

Preferably, the device may further include a drive unit connected to the cable body.

Preferably, the device may further include a locating unit disposed in the coil formed by the cable body.

According to another aspect, the embodiments of the present disclosure also provide a mobile terminal provided with the telescopic transmission cable device according to the embodiments of the present disclosure.

In the telescopic transmission cable device according to the present disclosure, when the cable body extends out to be connected to an external device in a wired manner, the regular wired charge function can be implemented; when the cable body is coiled up into a coil, the cable body is connected to the rectification part and further connected to the power supply to be charged through the rectification part, and then the coil can receive wireless electrical energy and charges the power supply to be charged through the rectification part. In this way, both wired charge function and wireless charge function can be effectively realized by properly changing the shape of the cable body and the circuit connection state only, without an additional wireless receiving coil. The present disclosure makes full use of the limited space of a mobile terminal and makes the charge of the mobile terminal more flexible and convenient.

DETAILED DESCRIPTION

The present disclosure is described below in further detail in conjunction with the accompanying drawings. It should be noted that specific embodiments described below are only used to explain the present disclosure but to limit the present disclosure.

Figure 1A:
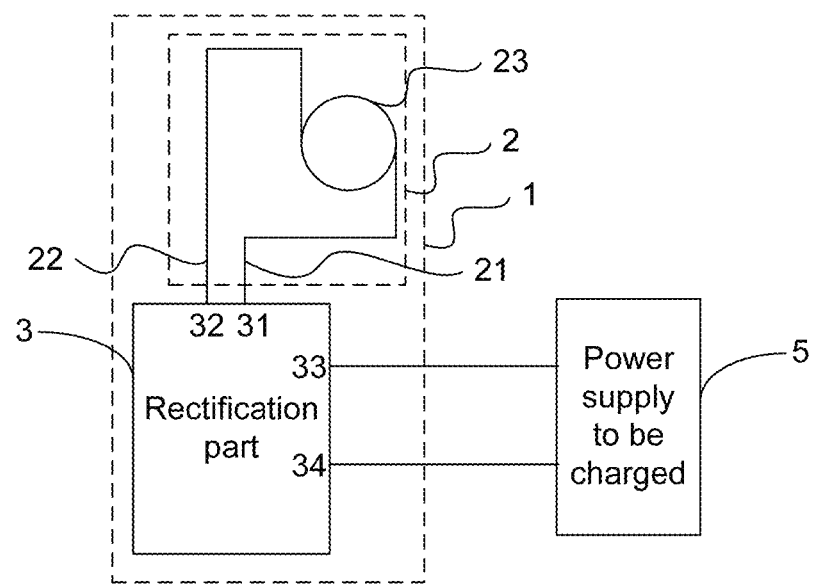
FIG. 1A is a structure diagram illustrating charging a power supply to be charged in a wireless manner by a telescopic transmission cable device according to an embodiment of the present disclosure.
Figure 1B:
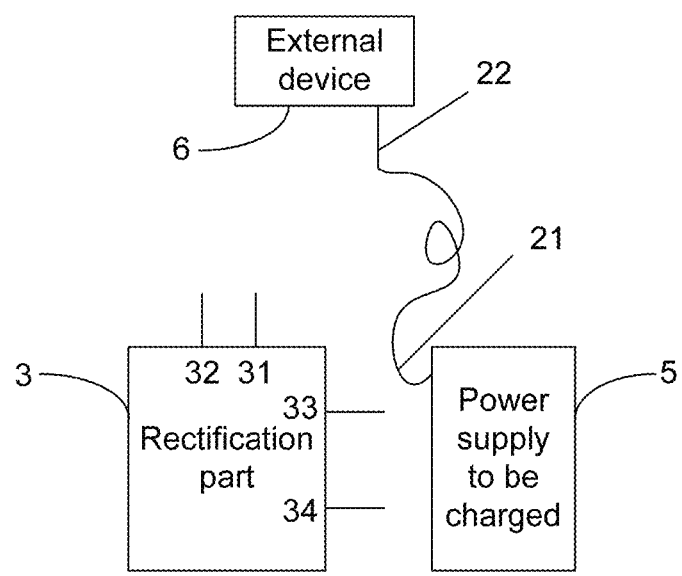
FIG. 1B is a structure diagram illustrating charging a power supply to be charged in a wired manner by a telescopic transmission cable device according to an embodiment of the present disclosure.

FIG. 1A and FIG. 1B show the structure of the telescopic transmission cable device according to an embodiment of the present disclosure and a circuit connection diagram. In FIG. 1A, the device charges a power supply to be charged in a wireless manner. In FIG. 1B, the device charges a power supply to be charged in a wired manner.

As shown in FIG. 1A and FIG. 1B, the embodiment of the present disclosure provides a telescopic transmission cable device 1, including a cable body 2 and a rectification part 3, wherein at least two wires (not shown) are contained in the cable body 2, one end of the cable body 2 is a built-in end 21 while the other end is an external connection end 22.

As shown in FIG. 1A, when the cable body 2 is coiled up into a coil 23, the external connection end 22 and the built-in end 21 are respectively connected to two input ends 31, 32 of the rectification part 3, and two output ends 33, 34 of the rectification part 3 are respectively connected to a positive electrode and a negative electrode of a power supply to be charged 5. Referring to FIG. 1B, the cable body 2 can extend out to be linear by an external force. At this time, the external connection end 22 and the built-in end 21 are respectively disconnected to the two input ends 31, 32 of the rectification part 3, and then the external connection 21 is connected to an external device 6. The two wires (not shown) of the cable body 2 at the built-in end 21 are respectively connected to the positive electrode and negative electrode of the power supply to be charged 5, and the two output ends 33, 34 of the rectification part 3 are respectively disconnected to the positive electrode and negative electrode of the power supply to be charged 5.

In the telescopic transmission cable device 1 according to the embodiment of the present disclosure, when the cable body 2 extends to be connected in a wired manner with the external device 6, the regular wired charge function can be completed. When the cable body 2 is coiled up into a coil 23, the cable body 2 is connected to the rectification part 3 and is further connected to the power supply to be charged 5 through the rectification part 3. At this time, the coil 23 can receive wireless electrical energy and charge the power supply to be charged 5 through the rectification part 3. In this way, both wired charge function and wireless charge function can be effectively realized by proper changes for the shape of the cable body 2 and the circuit connection state only, without an additional wireless receiving coil. The present disclosure makes full use of the limited space of a mobile terminal and thus makes the charge of the mobile terminal more flexible and convenient.

It should be noted that in the embodiment of the present disclosure, the cable body 2 of the telescopic transmission cable device 1 may consist of several wires insulated from each other. These wires can be used to transmit electrical energy and can be used to transmit data, specifically depending on a transmission protocol between devices. For example, the cable body 2 can be designed to have a Universal Serial Bus (USB) data transmission function. At this time, it is only needed to enclose four mutually insulated wires in an insulated layer according to the regulations in the USB communication protocol, wherein two wires are used to transmit data while the other two wires are used to transmit electrical energy. However, different from a traditional USB data line, the cable body 2 in the embodiment of the present disclosure has no signal shielding layer arranged outside the wires. That is to say, the cable body 2 itself may be a USB line without a shielding layer. In this way, external radio signals can be sensed by the wires, so that the cable body 2 can receive wireless electrical energy when coiled into the coil 23.

In the above embodiment, when the external connection end 22 of the cable body 2 is connected to the external device 6, two wires of the cable body 2 that are used to transmit electrical energy are respectively connected to the positive and negative electrodes of the power supply of the external device 6 and the positive and negative electrodes of the power supply to be charged 5 correspondingly. When the cable body 2 is coiled up into a coil 23 to receive wireless electrical energy, at least one wire in all the wires of the cable body 2 is intended to be connected at two ends to the input ends 31, 32 of the rectification part 3 respectively. When there is only one wire connected at two ends to the input ends 31, 32 of the rectification part 3 respectively, it can be considered that the coil 23 consists of only one wire. When there are more wires connected at two ends to the input ends 31, 32 of the rectification part 3 respectively, it can be considered that these wires are connected in parallel, which are coiled up into a coil 23 to receive wireless electrical energy.

It is clear from the above description that the built-in end 21 of the cable body 2 can be connected to the power supply to be charged 5 or can be connected to the rectification part 3, specifically depending on the applied charge method. The power supply to be charged 5 and the rectification part 3 can be connected or disconnected, depending on which charge method is applied. Optionally, the selection and switch of the above circuit connection can be implemented by a gating device or a controllable switch device having a circuit switch function, such as a multi-way switch, a single-pole double-throw switch or the like.

Figure 2A:
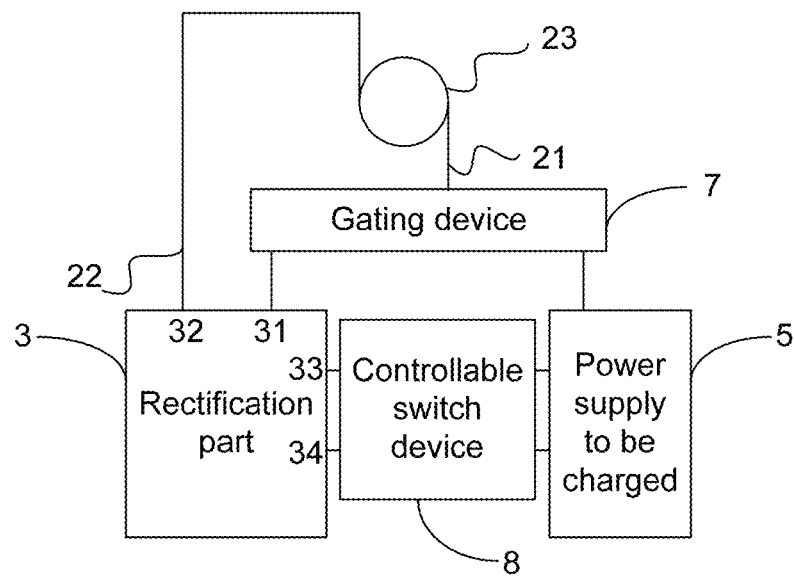
FIG. 2A is another structure diagram illustrating charging a power supply to be charged in a wireless manner by a telescopic transmission cable device according to an embodiment of the present disclosure.
Figure 2B:
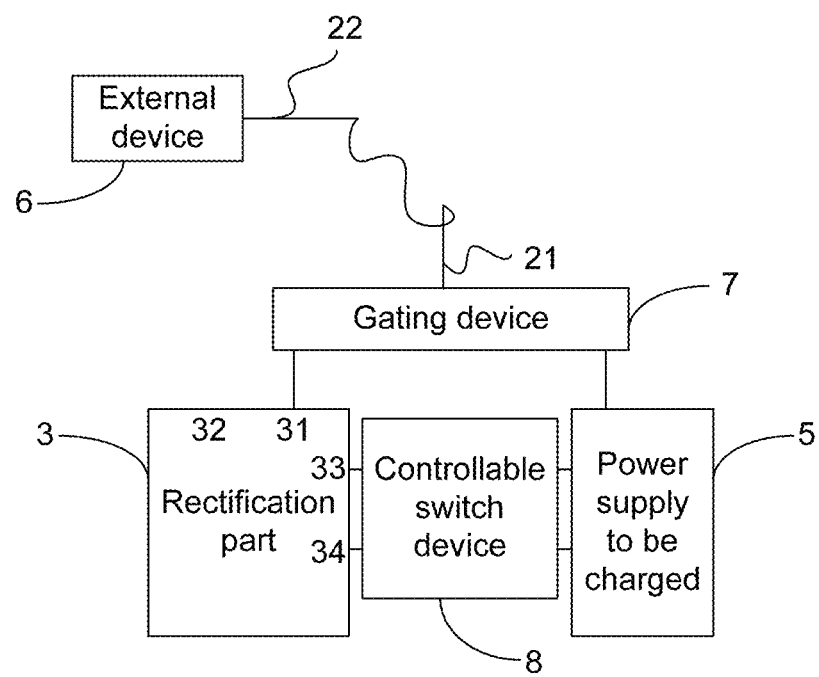
FIG. 2B is another structure diagram illustrating charging a power supply to be charged in a wired manner by a telescopic transmission cable device according to an embodiment of the present disclosure.

For example, as shown in FIG. 2A and FIG. 2B, in one embodiment of the present disclosure, the telescopic transmission cable device 1 further includes a gating device 7 and a controllable switch device 8, which can be cooperated to use so as to control the charge method for the power supply to be charged 5. The gating device 7 includes a connection end and two optional ends, so that the connection end is connected to one of the two optional ends, wherein the connection end is connected to the built-in end 21, and the two optional ends are respectively connected to the power supply to be charged 5 and one input end 31 of the rectification part 3. The controllable switch device 8 is disposed between the rectification part 3 and the power supply to be charged 5, so as to control the connection or disconnection between the rectification part 3 and the power supply to be charged 5.

That is to say, the built-in end 21 of the cable body can be optionally connected to the power supply to be charged 5 or one input end 31 of the rectification part 3 through the gating device 7. When the gating device 7 enables the built-in end 21 to be connected to the power supply to be charged 5, the controllable switch device 8 makes the positive and negative electrodes of the power supply to be charged 5 disconnect to two output ends 33, 34 of the rectification part 3 respectively. The cable body 2 can extend out by an external force, so that the external connection end 22 is connected to the external device 6. When the gating device 7 enables the built-in end 21 to be connected to one input end 31 of the rectification part 3, the controllable switch device 8 makes the positive and negative electrodes of the power supply to be charged 5 connect to two output ends of the rectification part 3 respectively. The cable body 2 is coiled up into a coil 23 so that the external connection end 22 is connected to another input end 32 of the rectification part 3. In this way, a user can change the circuit connection relationship of the cable body 2 and the shape of the cable body 2 through the gating device 7 and the controllable switch device 8, so as to enable the telescopic transmission cable device 1 to implement wired charge or wireless charge.

Specifically, the rectification part 3 has a circuit structure or device which converts the alternating current received by the coil 23 into direct current to output. Optionally, the rectification part 3 can be realized by a full-bridge rectifier circuit or a half-bridge rectifier circuit. The coil 23 and the rectification part 3 not only can receive external wireless electrical energy in an electro-magnetic induction manner, but also can receive external electrical energy in a magnetic resonance manner. Various specific circuit structures with electro-magnetic induction or magnetic resonance are known for those skilled in the art and are not described herein.

It can be understood that the size of the coil 23 formed by the cable body 2 not only affects the receiving efficiency of wireless electrical energy but also is restricted by the size requirement of the mobile terminal containing this coil 23. Therefore, the biggest diameter of the coil 23 should be designed in consideration with the two factors above, preferably between 4 cm and 8 cm.

Although the built-in end 21 can be connected to the power supply to be charged 5 or the rectification part 3 through the gating device 7 in the above embodiment, the present disclosure is not limited to this. In other embodiments of the present disclosure, the gating device 7 may include a third optional end, so that the connection end of the gating device 7 can be connected to one of the three optional ends. The third optional end is grounded or suspended in midair. As such, when the connection end of the gating device 7 is connected to the third optional end, that is, grounded or suspended in midair, the device stops charging the power supply to be charged 5.

Specifically, the cable body 2 can be extended by an external force exerted by a user, and the coiling up into a coil 23 can be implemented by the elasticity of the cable body 2. However, the present disclosure is not limited to the above. In other embodiments of the present disclosure, the telescopic transmission cable device 1 may further include a drive unit connected to the cable body 2. When the built-in end 21 of the cable body 2 is connected to the power supply to be charged 5, the drive unit drives the cable body 2 to extend. When the built-in end 21 is connected to one input end 31 of the rectification part 3, the drive unit drives the cable body 3 to coil up into a coil 23, thereby enabling a quick deformation of the cable body 2.

Preferably, the telescopic transmission cable device 1 may further include a locating unit disposed in the coil 23 formed by the cable body 2. When the cable body 2 is coiled up into a coil 23, the locating unit fixes the cable body.

Correspondingly, the embodiments of the present disclosure also provide a mobile terminal, which is provided with any one of the telescopic transmission cable devices described above and thus can implement corresponding beneficial technical effects. The previous part has given a detailed description and no further description is needed herein.

Although for the purpose of example, preferred embodiments of the present disclosure have been disclosed, those skilled in the art should understand that various improvements, additions and substitutions are possible. Therefore, the scope of the present disclosure shall not be limited to the above embodiments.

The invention claimed is:

1. A telescopic transmission cable device, comprising: a cable body and a rectification part, wherein the cable body comprises at least two wires insulated from each other, and one end of the cable body is a built-in end while the other end is an external connection end;
   when the cable body is coiled up into a coil, the external connection end and the built-in end are respectively connected to two input ends of the rectification part, and the two output ends of the rectification part are respectively connected to a positive electrode and a negative electrode of a power supply to be charged; and
   when the cable body is in a linear shape, the external connection end is connected to an external device, the two wires of the built-in end are respectively connected to the positive electrode and the negative electrode of the power supply to be charged, and the two output ends of the rectification part are respectively disconnected to the positive electrode and the negative electrode of the power supply to be charged.

2. The device according to claim 1, further comprising: a gating device and a controllable switch device,
   wherein the gating device comprises a connection end and two optional ends, so that the connection end is connected to one of the two optional ends,
   wherein the connection end is connected to the built-in end, and the two optional ends are respectively connected to the power supply to be charged and one of the two input ends of the rectification part; and,
   wherein the controllable switch device is disposed between the rectification part and the power supply to be charged.

3. The device according to claim 2, wherein the gating device further comprises a third optional end, so that the connection end is connected to one of the three optional ends; and wherein the third optional end is grounded or suspended in midair.

4. The device according to claim 1, wherein the cable body is a Universal Serial Bus (USB) without a shielding layer.

5. The device according to claim 1, wherein the rectification part comprises a full-bridge rectifier circuit or a half-bridge rectifier circuit.

6. The device according to claim 1, wherein the biggest diameter of the coil is between 4 cm and 8 cm.

7. The device according to claim 1, further comprising a drive unit, wherein the drive unit is connected to the cable body.

8. The device according to claim 1, further comprising a locating unit, wherein the locating unit is disposed in the coil formed by the cable body.

9. A mobile terminal, provided with a telescopic transmission cable device, wherein the telescopic transmission cable device comprises: a cable body and a rectification part,
   wherein the cable body comprises at least two wires insulated from each other, and one end of the cable body is a built-in end while the other end is an external connection end;
   when the cable body is coiled up into a coil, the external connection end and the built-in end are respectively connected to two input ends of the rectification part, and the two output ends of the rectification part are respectively connected to a positive electrode and a negative electrode of a power supply to be charged; and
   when the cable body is in a linear shape, the external connection end is connected to an external device, the two wires of the built-in end are respectively connected to the positive electrode and the negative electrode of the power supply to be charged, and the two output ends of the rectification part are respectively disconnected to the positive electrode and the negative electrode of the power supply to be charged.

10. The device according to claim 2, further comprising a drive unit, wherein the drive unit is connected to the cable body.

11. The device according to claim 3, further comprising a drive unit, wherein the drive unit is connected to the cable body.

12. The device according to claim 4, further comprising a drive unit, wherein the drive unit is connected to the cable body.

13. The device according to claim 5, further comprising a drive unit, wherein the drive unit is connected to the cable body.

14. The device according to claim 6, further comprising a drive unit, wherein the drive unit is connected to the cable body.

15. The device according to claim 2, further comprising a locating unit, wherein the locating unit is disposed in the coil formed by the cable body.

16. The device according to claim 3, further comprising a locating unit, wherein the locating unit is disposed in the coil formed by the cable body.

17. The device according to claim 4, further comprising a locating unit, wherein the locating unit is disposed in the coil formed by the cable body.

18. The device according to claim 5, further comprising a locating unit, wherein the locating unit is disposed in the coil formed by the cable body.

19. The device according to claim 6, further comprising a locating unit, wherein the locating unit is disposed in the coil formed by the cable body.

\* \* \* \* \*